United States Patent
Zhu

(10) Patent No.: US 11,151,442 B2
(45) Date of Patent: Oct. 19, 2021

(54) CONVOLUTIONAL NEURAL NETWORK PROCESSING METHOD AND DEVICE

(71) Applicant: Tencent Technology (Shenzhen) Company Limited, Guangdong (CN)

(72) Inventor: Ben Zhu, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 997 days.

(21) Appl. No.: 15/822,627

(22) Filed: Nov. 27, 2017

(65) Prior Publication Data

US 2018/0082175 A1    Mar. 22, 2018

Related U.S. Application Data

(63) Continuation of application No. PCT/CN2017/070628, filed on Jan. 9, 2017.

(30) Foreign Application Priority Data

Jan. 12, 2016    (CN) .......................... 201610017755.1

(51) Int. Cl.
*A61B 5/16*    (2006.01)
*C12N 15/10*    (2006.01)
(Continued)

(52) U.S. Cl.
CPC ............. *G06N 3/06* (2013.01); *G06F 9/5044* (2013.01); *G06N 3/04* (2013.01); *G06N 3/0454* (2013.01);
(Continued)

(58) Field of Classification Search
CPC ........ G06N 3/06; G06N 3/0454; G06N 3/063; G06N 3/04; G06N 3/084; G06F 9/5044; G06F 2209/501
(Continued)

(56) References Cited

U.S. PATENT DOCUMENTS

2008/0228719 A1* 9/2008 Abhyanker ............. G06F 16/29
2011/0029471 A1    2/2011 Chakradhar et al.
(Continued)

FOREIGN PATENT DOCUMENTS

CN    102799563 A    11/2012
CN    104035751 A    9/2014
(Continued)

OTHER PUBLICATIONS

International Search Report (English & Chinese) & Written Opinion (Chinese) of the ISA/CN, Haidian District, Beijing, dated Apr. 12, 2017. English translation of the ISR provided by http://globaldossier.uspto.gov.

(Continued)

*Primary Examiner* — Brandon S Cole
(74) *Attorney, Agent, or Firm* — Harness, Dickey & Pierce, P.L.C.

(57) ABSTRACT

A convolutional neural network (CNN) processing method and a CNN processing device are provided. The CNN processing method includes: acquiring an intensity type of a first module in a CNN model; in response of determining that the intensity type of the first module is a computation-intensity type, deploying the first module with an application specific integrated circuit (ASIC), where the first module occupies multiple arithmetic unit resources of the ASIC; acquiring the multiple arithmetic unit resources of the ASIC which are occupied by the first module; obtaining a first resource merging module by merging identical arithmetic unit resources among the multiple arithmetic unit resources of the ASIC which are occupied by the first module; and operating the first resource merging module by the ASIC.

20 Claims, 5 Drawing Sheets

(51) Int. Cl.
*A61B 5/00* (2006.01)
*B33Y 50/00* (2015.01)
*G06N 3/06* (2006.01)
*G06F 9/50* (2006.01)
*G06N 3/04* (2006.01)
*G06N 3/063* (2006.01)

(52) U.S. Cl.
CPC ....... *G06N 3/063* (2013.01); *G06F 2209/501* (2013.01)

(58) Field of Classification Search
USPC ...................................................... 706/1–62
See application file for complete search history.

(56) References Cited

U.S. PATENT DOCUMENTS

| | | | | |
|---|---|---|---|---|
| 2013/0132962 | A1* | 5/2013 | De Smet | G06F 9/4881 718/102 |
| 2015/0032674 | A1* | 1/2015 | Cichosz | G06N 5/003 706/12 |
| 2015/0120714 | A1* | 4/2015 | Xu | G06F 16/24578 707/723 |
| 2015/0371359 | A1 | 12/2015 | Wu et al. | |
| 2016/0063345 | A1* | 3/2016 | Nomura | G06K 9/00369 382/195 |
| 2016/0073992 | A1* | 3/2016 | Liu | A61B 6/461 600/411 |
| 2016/0155066 | A1* | 6/2016 | Drame | G06N 3/02 706/12 |
| 2016/0314410 | A1* | 10/2016 | Carmichael | H04N 21/4668 |
| 2016/0321777 | A1 | 11/2016 | Jin et al. | |
| 2017/0177584 | A1* | 6/2017 | Narasimha | H04N 21/235 |
| 2017/0268896 | A1* | 9/2017 | Bai | G01C 21/3697 |
| 2018/0082175 | A1* | 3/2018 | Zhu | G06N 3/063 |
| 2018/0211157 | A1* | 7/2018 | Liu | G06T 3/4046 |

FOREIGN PATENT DOCUMENTS

| | | |
|---|---|---|
| CN | 104915195 A | 9/2015 |
| CN | 104915322 A | 9/2015 |
| CN | 105678379 A | 6/2016 |

OTHER PUBLICATIONS

Extended European Search Report regarding Application No. 17738111.8 dated Oct. 2, 2019.

Srimat Chakradhar et al.; "A Dynamically Configurable Coprocessor for Convolutional Neural Networks", Proceedings of the 37th Annual International Symposium on Computer Architecture, ISCA '10, ACM Press, New York, NY, Jun. 19, 2010, pp. 247-257.

Chen Zhang et al., "Optimizing FPGA-Based Accelerator Design for Deep Convolutional Neural Networks", Proceedings of the the 2015 ACM/SIGDA International Symposium on Field-Programmable Gate Arrays, New York NY, Feb. 22, 2015, pp. 161-170.

Maurice Peemen et al., "Memory-Centric Accelerator Design for Convolutional Neural Networks", 2013 IEEE 31st International Conference on Computer Design, Oct. 1, 2013, pp. 13-19.

Yongming Shen et al., "Maximizing CNN Accelerator Efficiency through Resource Partitioning", Jun. 30, 2016, https://arxiv.org/abs/1607.00064v1.

First Chinese Office Action regarding Application No. 201610017755.1 dated Mar. 4, 2020. English translation provided by Unitalen Attorneys at Law.

Zhijian, Lu, "The Researh on Parallel Architecture for FPGA-based Convolutional Neural Networks," Dissertation of Doctor of Engineering, Harbin Engineering University, Submission Date: May 2013, Oral Examination Date: Jun. 2013; Harbin Engineering University.

Yu, Qi et al., "A Deep Learning Prediction Process Accelerator Based FPGA," 15th IEEE/ACM International Symposium on Cluster, Cloud and Grid Computing, 2015, pp. 1159-1162.

* cited by examiner

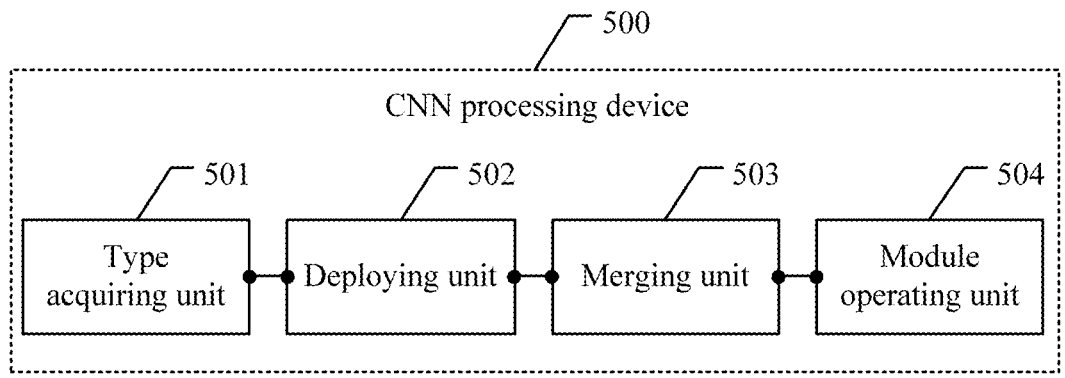
Figure 5-a
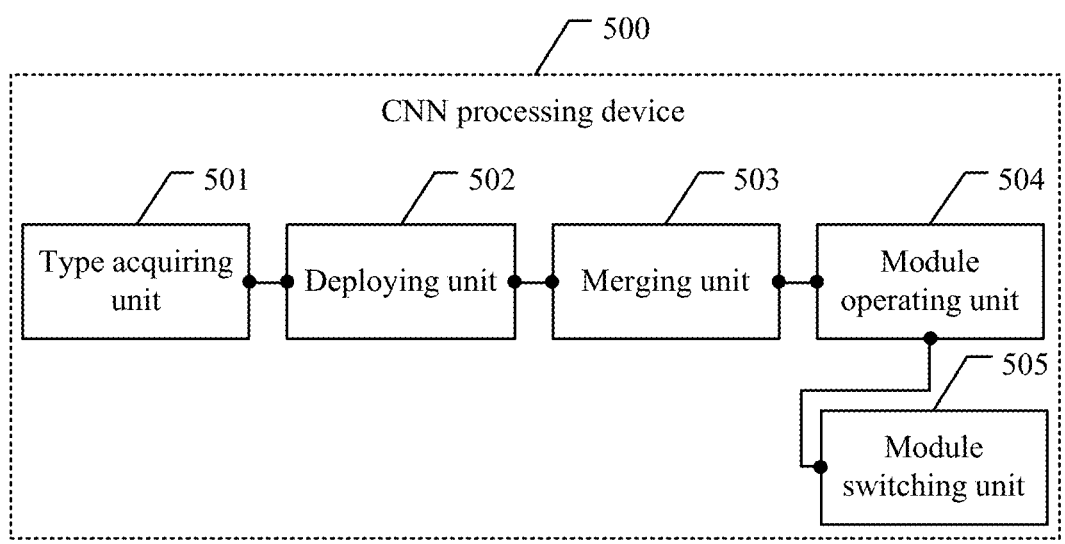
Figure 5-b

CONVOLUTIONAL NEURAL NETWORK PROCESSING METHOD AND DEVICE

The present application is a continuation of International Patent Application No. PCT/CN2017/070628, filed on Jan. 9, 2017, which claims priority to Chinese Patent Application No. 201610017755.1, titled "CNN PROCESSING METHOD AND DEVICE", filed on Jan. 12, 2016 with the State Intellectual Property Office of People's Republic of China, both of which are incorporated herein by reference in their entireties.

FIELD

The present disclosure relates to the field of computer technology, and in particular to a convolutional neural network (CNN) processing method and a CNN processing device.

BACKGROUND

With the development of machine learning, the accuracy of picture recognition is improved, image recognition technology is used in more and more applications, such as the earliest digital recognition and the latest face recognition applied widely. A large amount of computation resources are required for performing computation in order to make a level of the image recognition reach an intelligent level of a human, and a great requirement on computation performance is required. A resource scale consumed by the computation is required to be limited in a case that requirement on the computational performance is met, to save a computation cost.

At present, a main image recognition algorithm is a CNN, which mainly implemented by a graphics processing unit (GPU) and a central processing unit (CPU), and which results in a large amount of computation and a high cost. Although the GPU has a high parallel computation efficiency, there is a problem that computation resource components are utilized without a high use efficiency.

Currently, an implementation scheme of the CNN is mainly based on the CPU and the GPU. The implementation scheme of the CNN mainly includes the following three steps: an inputting step, a feature extracting step and a classifying step, where the feature extracting step is the most complex in computation and consumes the most resources. The feature extracting step mainly involves computation for the following two layers: a sampling layer and a convolution layer. In an implementation of a GPU-based model, computations with a higher complexity are completed by the GPU. With the GPU-based model, the computation performance of the CNN can be improved, and a computation time can be reduced.

The major advantage of the implementation scheme of the CNN using the CPU and the GPU is that the implementation scheme has high performance. However, a cost of deploying the GPU is high, a cost of deploying a large GPU cluster is even higher, and the power consumed by the GPU is great, thereby resulting in a high cost in both hardware deployment and subsequent operation.

SUMMARY

In the embodiments of the present disclosure, it is provided a CNN processing method and a CNN processing device, for implementing a module arithmetic in a CNN model by an application specific integrated circuit (ASIC), to ensure computation performance of the CNN and reduce an arithmetic cost.

In a first aspect, a CNN processing method is provided according to an embodiment of the present disclosure, which includes:

acquiring an intensity type of a first module in a CNN model;

in response of determining that the intensity type of the first module is a computation-intensity type, deploying the first module with an application specific integrated circuit (ASIC), where the first module occupies multiple arithmetic unit resources of the ASIC;

acquiring the multiple arithmetic unit resources of the ASIC which are occupied by the first module;

obtaining a first resource merging module by merging identical arithmetic unit resources among the multiple arithmetic unit resources of the ASIC which are occupied by the first module; and operating the first resource merging module by the ASIC.

In a second aspect, a CNN processing device is further provided according to an embodiment of the present disclosure, which includes:

a type acquiring unit, configured to acquire an intensity type of a first module in a CNN model;

a deploying unit, configured to deploy the first module with an application specific integrated circuit ASIC and acquire multiple arithmetic unit resources of the ASIC which are occupied by the first module, in a case that the intensity type of the first module is a computation-intensity type;

a merging unit, configured to obtain a first resource merging module by merging identical arithmetic unit resources among the multiple arithmetic unit resources of the ASIC which are occupied by the first module; and a module operating unit, configured to operate the first resource merging module by the ASIC.

In a third aspect of the present disclosure, it is provided a nonvolatile storage medium for storing one or more computer programs, where the computer programs include instructions executable by a processor including one or more memories; and the processor executes the instructions to perform the above convolutional neural network processing method.

In an embodiment of the present disclosure, an intensity type of a first module in a CNN model is acquired firstly, the first module is deployed with an ASIC and multiple arithmetic unit resources of the ASIC which are occupied by the first module are acquired in a case that the intensity type of the first module is a computation-intensity type, identical arithmetic unit resources among the multiple arithmetic unit resources of the ASIC which are occupied by the first module are merged to obtain the first module deployed with the ASIC in which arithmetic unit resources are merged, and the first module deployed with the ASIC in which arithmetic unit resources are merged is operated. In an embodiment of the present disclosure, the first module of the computation-intensity type may be migrated to the ASIC, so that module arithmetic in the CNN model is implemented by the ASIC without using the GPU, while both a deployment cost and an operation cost of the ASIC are much less than that of the GPU. In the embodiments of the present disclosure, the identical arithmetic unit resources in the first module of the computation-intensity type are merged, so that the arithmetic unit resources are utilized with a highest use efficiency, and thus, the computation performance of the CNN can be ensured.

BRIEF DESCRIPTION OF THE DRAWINGS

In order to illustrate the technical solution in the embodiments of the present disclosure more clearly, the drawings, which are intended to be used in the description of the embodiments, are briefly described hereinafter. It is apparent that the drawings in the following description show merely some of the embodiments of the present disclosure, other drawings may be obtained by those skilled in the art based on the provided drawings.

FIG. 5-a is a schematic diagram showing a composition structure of a CNN processing device according to an embodiment of the present disclosure;

FIG. 5-b is a schematic diagram showing a composition structure of another CNN processing device according to an embodiment of the present disclosure.

DETAILED DESCRIPTION OF EMBODIMENTS

In the embodiments of the present disclosure, it is provided a CNN processing method and a CNN processing device, for implementing module arithmetic in a CNN model by an ASIC, to ensure computation performance of the CNN and reduce an operation cost.

In order to make the objects, features and advantages of the present disclosure more apparent and understood, the technical solutions in the embodiments of the present disclosure are described clearly and completely in conjunction with the accompanying drawings in the embodiments of the present disclosure hereinafter. It is apparent that the below-described embodiments are merely some of embodiments of the present disclosure, and are not all the embodiments of the present disclosure. All other embodiments obtained by those skilled in the art based on the embodiments in the present disclosure fall within the protection scope of the present disclosure.

The terms "comprising", "including" and any variations thereof in the description, claims and the above-described drawings of the present disclosure are intended to cover an inclusion inclusively, in order to include processes, methods, systems, products or devices of a series of units, which are not necessarily limited to those units, but may include other units that are not clearly listed or inherent to the processes, methods, products, or devices.

Detailed description is given as follows.

Figure 1:
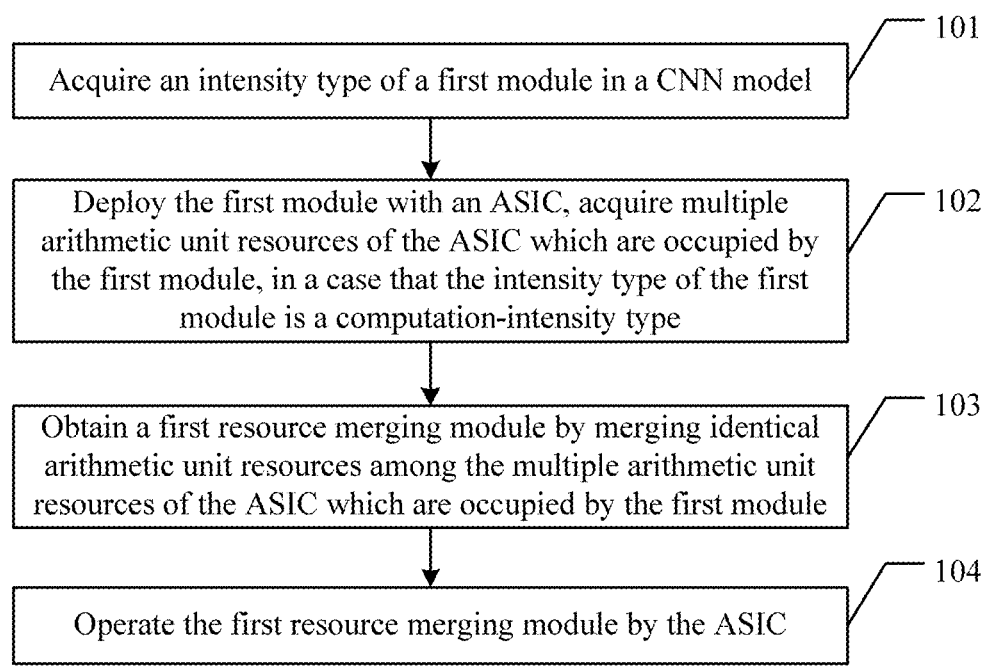
FIG. 1 is a schematic flow chart showing a CNN processing method according to an embodiment of the present disclosure.

As shown in FIG. 1, a CNN processing method according to an embodiment of the present disclosure may be applied to an arithmetic acceleration process of the CNN. The CNN processing method according to the embodiment of the present disclosure may include the following step 101 to step 104.

In step 101, an intensity type of a first module in a CNN model is acquired.

In the embodiment of the present disclosure, there may be a variety of CNN models such as an open source convolutional architecture for fast feature embedding (CAFFE) model and a cuda-convNet model. The CNN model may include multiple modules based on an arithmetic order and a layer division. In the embodiment of the present disclosure, a first module included in the CNN model is described as an example. In the embodiment of present disclosure, other modules included in the CNN model may be implemented with reference to a manner for processing the first module in the following embodiments. First, the first module in the CNN model is acquired and the intensity type of the first module is determined. The intensity type of a module in the CNN model is a type determined based on a computation-intensity degree of a layer of the convolution neural network. The intensity type of a module may be various, for example, the module may be of a computation-intensity type or a storage-intensity type. Specifically, the intensity type of each module in the CNN model may be determined based on an implementation scenario of the CNN. For example, in a case that the CNN model is a CAFFE model, the CAFFE model includes a convolution layer, a pooling layer, a data layer, and the like. The convolution layer and the pooling layer include modules with a huge amount of computation, which are of a computation-intensity type, and acceleration computation may be performed on these modules with the CNN processing method according to the embodiment of the present disclosure. Modules in the data layer are of a storage-intensity type and usually involve not too large amount of computation, and may be processed by a central processing unit (CPU).

In step 102, the first module is deployed with an application specific integrated circuit (ASIC), and multiple arithmetic unit resources of the ASIC which are occupied by the first module are acquired, in a case that the intensity type of the first module is a computation-intensity type.

In the embodiment of the present disclosure, in a case that the acquired intensity type of the first module in the CNN model is a computation intensity type, the first module of the computation-intensity type is deployed with the ASIC, that is, a function of the first module is implemented by arithmetic unit resources of the ASIC. After the first module is deployed with the ASIC, the first module occupies multiple arithmetic unit resources of the ASIC. For example, in a case that the first module is a CAFFE model, a large number of multiplication resources for computing a convolution are used. The first module may be considered as being of computation-intensity type, the first module may be deployed with the ASIC, and the first module occupies the arithmetic unit resources of the ASIC.

In some embodiments of the present disclosure, the first module of the computation-intensity type is deployed with the ASIC to implement a computation function. In the embodiments of the present disclosure, the CNN processing is implemented without using a GPU to avoid a high consumption power of the GPU and avoid a hardware deployment cost and an operation cost due to using the GPU. In the embodiment of the present disclosure, the first module in the CNN model is deployed and operated by the ASIC, the operation cost of ASIC is much lower than that of the GPU. Furthermore, in some embodiments of the present disclosure, the ASIC may be a field programmable gate array (FPGA). That is, in the embodiment of the present disclosure, the first module of the computation-intensity type may be deployed with the FPGA to implement an arithmetic function. That is, in the embodiment of the present disclosure, the first module may be implemented and operated by the FPGA. It should be noted that the first module in the embodiment of the present disclosure may not be limited to being deployed with the FPGA, and the first module of the computation-intensity type may also be deployed with other programmable devices other than the FPGA. For example, the first module may be deployed with a complex programmable logic device (CPLD). In the embodiment of the present disclosure, any semicustom circuit used as an application specific integrated circuit may be used for deploying the first module.

In step 103, a first resource merging module is obtained by merging identical arithmetic unit resources among the multiple arithmetic unit resources of the ASIC which are occupied by the first module.

The first module occupies multiple arithmetic unit resources of the ASIC after the first module is deployed with the ASIC. The first module may occupy multiple identical arithmetic unit resources, or may occupy multiple different arithmetic unit resources, depending on an implementation scenario. In a case that there are identical arithmetic unit resources among the multiple arithmetic unit resources which are occupied by the first module, the identical arithmetic unit resources may be merged. That is, there may be multiple resources using an identical arithmetic unit in the multiple arithmetic unit resources of the first module. The identical arithmetic unit resources may be merged into one arithmetic unit resource, thereby achieving a maximum utilization of the arithmetic unit resources. An example is described for the case that the identical arithmetic unit resources may be merged. For example, the computation resources may be reused by the simplest computation such as addition, subtraction, multiplication and division. However, the different arithmetic unit resources may not be merged, for example, resources which have a complex logic and may not be simply reused may not be merged, and resources which have completely different arithmetic operations may not be merged. For the multiple arithmetic unit resources of the ASIC which are occupied by the first module, after the identical arithmetic unit resources are merged, the first module deployed with the ASIC in which the arithmetic unit resources being merged, that is a first resource merging module, may be obtained. With the first module with the resources being merged, utilization of the overall resources of the ASIC is improved.

In step 104, the first resource merging module is operated by the ASIC.

In the embodiment of the present disclosure, the first resource merging module obtained in step 103 described above may be operated by the ASIC to implement a function of the first module by the ASIC. For example, in a case that the first module is a convolution arithmetic module, the convolution arithmetic module is operated by the ASIC after the arithmetic unit resources are merged in step 103, so that arithmetic in the convolution layer of the CNN model can be implemented. Therefore, in the embodiment of the present disclosure, computation of the CNN can be completed by operating the first module by the ASIC, and the computation performance of the CNN can be improved by merging the arithmetic unit resources, so that the CNN processing method provided in the embodiment of the present disclosure can achieve the same efficiency without a GPU as that achieved by the GPU for performing a CNN computation, thereby saving the hardware deployment cost and the operation cost.

In some embodiments of the present disclosure, in addition to performing the above-described steps, the CNN processing method provided in the embodiment of the present disclosure may further includes the following step A1 to step A4.

In step A1, an intensity type of a second module in the CNN model is acquired.

In step A2, the second module is deployed with the ASIC and multiple arithmetic unit resources of the ASIC which are occupied by the second module are acquired, in a case that the intensity type of the second module is the computation-intensity type.

In step A3, the first module and the second module are merged to obtain a third module, in a case that the arithmetic unit resources occupied by the first module are identical or partially identical to the arithmetic unit resources of the ASIC which are occupied by the second module. A function of the third module includes a function of the first module and a function of the second module.

In step A4, the third module is operated by the ASIC.

In some embodiments of the present disclosure, the CNN model may include, in addition to the first module, a second module, which is a module in the CNN model and may be used to implement a specific computation function in the CNN model. In connection with step 101 to step 102, it can be seen that the CNN model in the embodiment of the present disclosure may include a first module and a second module, both of which may be deployed with the ASIC. For example, both the first module and the second module included in the CNN model can be deployed with the FPGA. After the first module and the second module are deployed with the ASIC, each of the first module and the second module occupies multiple arithmetic unit resources of the ASIC, it may be further determined whether there are identical arithmetic unit resources between the multiple arithmetic unit resources of the ASIC which are occupied by the first module and the multiple arithmetic unit resources of the ASIC which are occupied by the second module. In a case that the first module and the second module occupy identical arithmetic unit resources, step A3 is performed, where the first module and the second module are merged to obtain a third module deployed with the ASIC with the modules being merged. The function of the third module may include the function of the first module and the function of the second module. That is, the first module and the second module may be merged at a module level in a case that the first module and the second module deployed with the ASIC occupy identical arithmetic unit resources, the first module and the second module are implemented through a separate module (which is defined as a third module). The function of the third module includes the function of the first module and the function of the second module. In step A4, the third module is operated by the ASIC to implement the function of the first module or the function of the second module. In the embodiment of the present disclosure, two modules in the CNN model may be merged to implement multiple functions of an individual module and improve the computation performance of the CNN.

In some embodiments of the present disclosure, the above step A3 in which the first module and the second module are merged may include the following step A131.

In step A131, identical arithmetic unit resources of the ASIC which are occupied by the first module and the second module are merged, and an input interface of the first module and an input interface of the second module are merged, and an output interface of the first module and an output interface of the second module are merged.

For the first module and the second module deployed with the ASIC, the identical arithmetic unit resources which are occupied by the first module and the second module may be merged, and the input interfaces and the output interfaces of the two modules may also be merged, that is, the input interface of the first module and the input interface of the second module are merged, the output interface of the first module and the output interface of the second module are merged. Since inputs and outputs of multiple modules in the CNN model occupy interface resources of the ASIC, resource waste caused by the inputs and outputs can be reduced. A framework of the modules can be integrated by merging the input interfaces of the two modules and merging the output interfaces of the two modules. It should be noted that the merging of the two modules is described as an example in an implementation scenario of step A1 to step A4 in the embodiment of the present disclosure, and it is not limited that three or even more modules may be merged in the embodiment of the present disclosure with reference to the implementation herein, and is not illustrated here.

In some embodiments of the present disclosure, the above step A4 of operating the third module deployed with the ASIC in which the modules are merged may include the following step A141 to step A142.

In step A141, a come into effect condition is set for the function of the third module based on the function of the first module and the function of the second module.

In step A142, in a case that the come into effect condition for the third module is met, the function of the third module is implemented by the ASIC.

When the third module is operated by the ASIC, the operation of the third module can implement the function of the first module and the function of the second module. Since the third module is to implement the function of the first module in some cases and is to implement the function of the second module in other cases, come into effect conditions have to be set for all the functions of the third module, to determine that in which case the third module implements the function of the first module and in which case the third module implements the function of the second module. Come into effect conditions may be set for different functions of the third module, so that each function of the third module may be implemented under a corresponding come into effect condition. For example, the function of the first module is function A, the function of the second module is function B, and the function of the generated third module include the function A and the function B. For example, inputs of the function A are 1, 2, inputs of the function B are 1, 2, 3, in this case, inputs of the merged AB are 1, 2, 3. An come into effect condition set for implementing the function A is that the input 3 is invalid, an come into effect condition set for implementing the function B is that the input 3 is valid. Therefore, it is determined whether the function A or the function B is implemented by the third module based on the set come into effect condition.

In some embodiments of the present disclosure, after step A2 of deploying the second module with the ASIC and acquiring multiple arithmetic unit resources of the ASIC which are occupied by the second module, the CNN processing method provided in the embodiment of the present disclosure may further include the following step A5 to step A6.

In step A5, a second resource merging module is obtained by merging identical arithmetic unit resources among the multiple arithmetic unit resources of the ASIC which are occupied by the second module.

In step A6, the second resource merging module is operated by the ASIC.

Implementations of step A5 to step A6 is similar to the implementations of step 103 to step 104 described above, the difference between them is that in step A5 to step A6, the arithmetic unit resources for the second module are merged and the second module is operated, for details refer to the description of the previous embodiments.

In some embodiments of the present disclosure, in addition to performing the above-described steps, the CNN processing method provided in the embodiment of the present disclosure may further includes the following step B1 to step B2.

In step B1, an operation state of the first resource merging module on the ASIC is monitored during operating the first resource merging module by the ASIC.

In step B2, after the first resource merging module completes operation on the ASIC, the first resource merging module is unloaded from the ASIC and a fourth module in the CNN model is loaded to the ASIC.

The CNN model includes multiple modules. An implementation of module switching in the embodiment of the present disclosure is described by taking the CNN model including two modules as an example, the module switching is performed to solve a problem that the resources of the ASIC are not sufficient to deploy all the modules. For example, the CNN model includes a first module and a fourth module. In step 104, the operation state of the first resource merging module on the ASIC is monitored during operating the first resource merging module by the ASIC. The operation state of the module in the CNN model on the ASIC may include three states, which are being operating, completing operation and to be operated. If the first resource merging module is operating, the operation state of the first resource merging module on the ASIC is monitored. Since not each module is in a computation state all the time during the arithmetic of the CNN model, there is an order of executing the modules. Therefore, the first resource merging module may be unloaded from the ASIC after the first resource merging module completes operation. At this point, the fourth module is to be operated. The fourth module in the CNN model may be loaded to the ASIC, so that the fourth module may be operated by the ASIC. The deployment and the computation of all the modules in the CNN model can be implemented through the module switching between the first resource merging module and the fourth module. It should be noted that although the module switching is illustrated by taking the CNN model including two modules in the above-described embodiment as an example, the CNN model may include more modules in practice. The process of the module switching may be referred to the description of step B1 and step B2.

In some embodiments of the present disclosure, in addition to performing the above-described steps, the CNN processing method provided in the embodiment of the present disclosure may further include step C1.

In step C1, a mathematical library of the CNN model is deployed on the ASIC, the mathematical library includes the first module.

A different CNN model may be set with a mathematical library. The mathematical library in the CNN model may include the first module, and may include the second module and the fourth module described above. In some embodiments of the present disclosure, the mathematical library of the CNN model may be deployed on the ASIC, so that modules included in the mathematical library of the CNN model may be deployed with the ASIC, thereby saving more arithmetic unit resources. For example, in a case that the CNN model is CAFFE, in an original implementation of the CAFFE, each of simple computation modules included in the mathematical library may implement a small interface, an actual function of which is very simple, such as addition, subtraction, multiplication and division. If each of the computation modules is implemented by the ASIC, many frame resources are wasted, which indicates a waste of interfaces. Moving the mathematical library directly to the ASIC can avoid such a waste of many resources.

It can be known based on the above description of the embodiment of the present disclosure that, an intensity type of a first module in a CNN model is acquired firstly, the first module is deployed with an ASIC and multiple arithmetic unit resources of the ASIC which are occupied by the first module are acquired in a case that the intensity type of the first module is a computation-intensity type, identical arithmetic unit resources among the multiple arithmetic unit resources of the ASIC which are occupied by the first module are merged to obtain a first resource merging module, and the first resource merging module is operated by the ASIC. In an embodiment of the present disclosure, the first module of the computation-intensity type may be migrated to the ASIC, so that module arithmetic in the CNN model is implemented by the ASIC without using the GPU, while both a deployment cost and an operation cost of the ASIC are much less than that of the GPU. In the embodiments of the present disclosure, the identical arithmetic unit resources in the first module of the computation-intensity type are merged, so that the arithmetic unit resources are utilized with a highest use efficiency, and thus, the computation performance of the CNN can be ensured.

The following application scenarios are specifically described below as examples in order to better understand and implement the above-described embodiments of the present disclosure. For example, in a case that the CNN model is CAFFE, modules in the CAFFE model are deployed with the FPGA in which the resources may be programmed, thereby improving the utilization and reducing the cost under the same resources. In the embodiment of the present disclosure, the CNN may be implemented and deployed by using the FPGA to overcome a resource constraint. FPGA differs from GPU in that the resource utilization of FPGA is higher than that of GPU under the same components, which leads to that FPGA can use less component resources for achieving the same performance as that of GPU, thereby saving more cost. However, for a more complex model, there may be a probability that not all of the computation layers can be deployed due to that resources of FPGA are much less relative to resources of GPU. In the embodiment of the present disclosure, a process and a method for deploying various layers of the CNN on the FPGA are described by taking the CAFFE model as an example.

Figure 2:
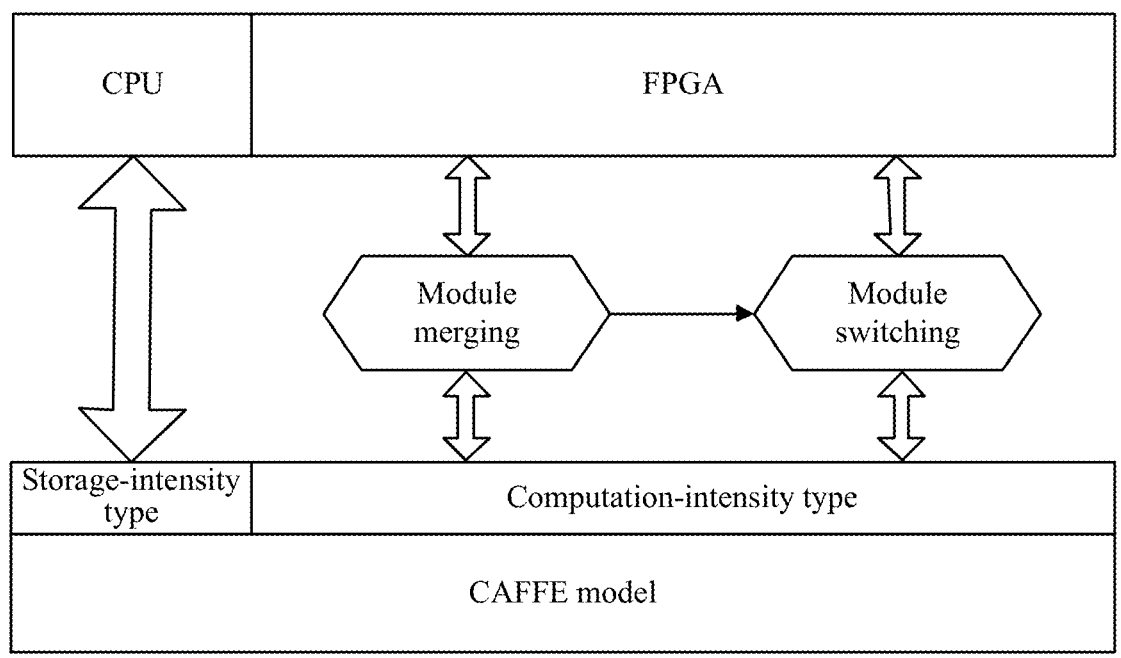
FIG. 2 is a schematic diagram showing an implementation architecture of a CNN processing method in a CAFFE model according to an embodiment of the present disclosure.

In the embodiment of the disclosure, an implementation of CPU compute unified device architecture (CUDA) of the CAFFE model can be transformed into an implementation of an open computing language (opencl) on the FPGA, so that the whole model can be deployed and operated by the FPGA. As shown in FIG. 2, FIG. 2 is a schematic diagram showing an implementation architecture of a CNN processing method in a CAFFE model according to an embodiment of the present disclosure. In the embodiment of the present disclosure, the following three steps may be performed.

1) Module selecting. It is determined whether each module in the CNN model is implemented by the FPGA based on a computation-intensity degree of a layer of the convolution neural network.

2) Resource merging. Arithmetic unit resources and framework resources of multiple modules are merged to integrate resources of the modules deployed with the FPGA to reduce the waste of resources.

3) Module switching. Multiple modules are operated and switched on the FPGA by using a delay of the arithmetic between multiple layers and between multiple modules.

First, the module selecting is illustrated. A convolution neural network includes multiple layers, for example, the CAFFE model includes a convolution layer, a pooling layer, a data layer and the like. The convolution layer is a layer for extracting picture features, a pooling layer is a layer for classifying a large number of the extracted picture features, such as taking a maximum value of a feature, and reducing data complexity. The data layer is a layer for storing original data, the data layer is, for example, a database, a disk or a memory. In the CAFFE model, some layers on which an amount of computation is not large, for example, the data layer, are suitable for being processed by a CPU. Some layers on which an amount of computation is large, for example, the convolution layer, are required to perform an acceleration computation. It is important to implement the most time-consuming resource using the opencl due to the limited resources of the FPGA. The module selecting has to follow the following principles: layers and modules of a computation-intensity type which have a high computation complexity and a high computation frequency, for example, a convolution computation module in the convolution layer, can be implemented by the FPGA; layers and modules of a storage-intensity type for accessing memories and switching which have a high requirement on a memory bandwidth and have a less amount of computation, such as the data layer, are not suitable for being implemented by the FPGA; and it may be determined whether to implement computation modules having a high computation complexity and a low computation frequency by the FPGA based on the resources of the FPGA.

Next, the resource merging is illustrated by examples. A lot of computation resources are used in the CAFFE model, especially multiplication resources for computing a convolution. However, resources of the FPGA are limited, for example, the number of multiplier resources of a digital signal processor (DSP) on a board suitable for developing the opencl in altera stratix V is only 256. All the modules capable of being accelerated in the CAFFE model are mitigated to the FPGA. For example, the convolution computation module is an module capable of being accelerated, the random computation module is also an module capable of being accelerated, and all the modules capable of being accelerated are models of a computation-intensity type. However, data storage is an operation of a storage-intensity type and can not be accelerated. After the modules capable of being accelerated are deployed with the FPGA, the identical arithmetic unit resources occupied by the multiple models are merged, such that the resources can be utilized with a highest use efficiency. For arithmetic unit resources that can not be merged, the whole modules may be merged, such that an individual module implements multiple functions.

Figure 3:
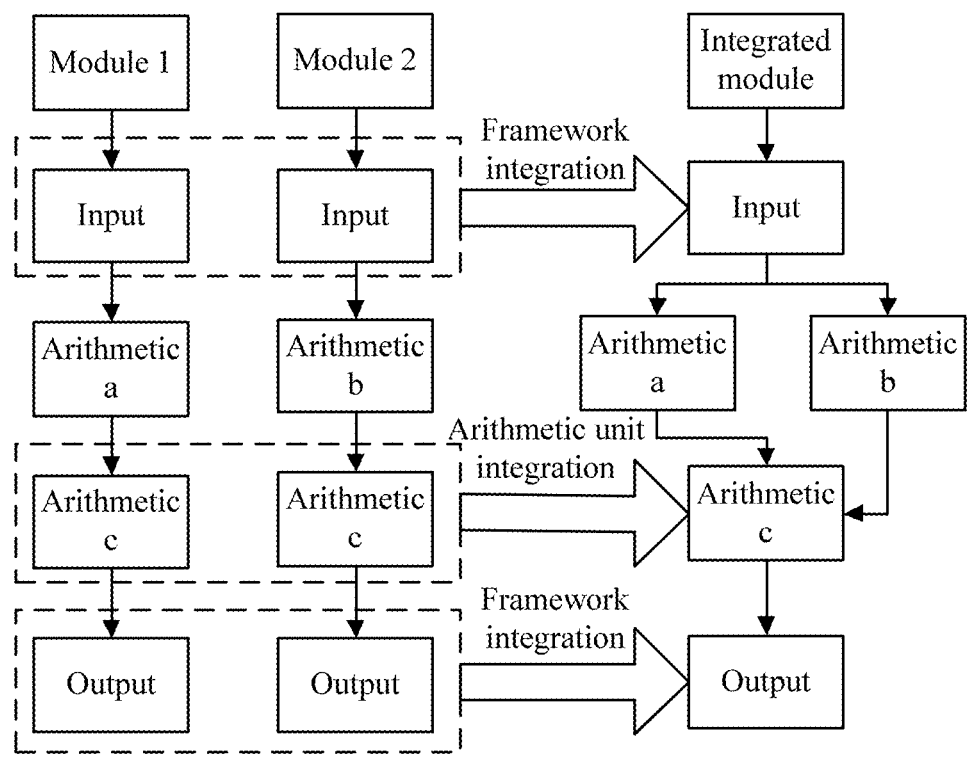
FIG. 3 is a schematic diagram showing a resource integrating process according to an embodiment of the present disclosure.

In some embodiments of the present disclosure, each module occupies a portion of a lookup table (LUT) and a memory (MEM) as a module interface, a selector, and the like once the module is implemented by the FPGA. An implementable way is to migrate a whole mathematical library used by the CAFFE model to the FPGA in a case that various modules in the mathematical library only implement interfaces and do not implement functions. As shown in FIG. 3, FIG. 3 is a schematic diagram showing a resource integrating process according to an embodiment of the present disclosure. The integration includes: arithmetic unit integration and framework integration. In practice, overall resources can be reduced by about 8% after the resources occupied by modules are merged.

In the arithmetic unit integration, the arithmetic unit includes a multiplier, an adder and other computers that can be implemented by a DSP. The convolution layer of the CNN mainly involves convolution computation which includes multiplication and addition and is suitable for arithmetic unit integration. Similarly, the models in the mathematical library of the CAFFE model also include dot-multiplication, addition-multiplication, zoom, multiplication-addition, and the like, which contain multiplication operations and addition operations that may be merged. The integrating method is illustrated as follows. 1. Addition and multiplication in multiple modules are specified to use the same adder and the same multiplier. For example, in FIG. 3, the arithmetic c in module 1 and the arithmetic c in module 2 are merged into an arithmetic c. 2. In a case that two modules deployed with the FPGA are located far apart, a time delay can not be met when sharing the arithmetic, it may be tried to merge the modules, implement a variety of functions together, and share inputs and outputs. For example, two arithmetical modules, when deployed with the FPGA, are spaced far apart on elements of the printed circuit board (PCB), if only one of the components is reused, a circuit delay does not meet the standard. In this case, the whole arithmetical module is directly merged together, so that the resources may be merged.

In the framework integration, interface resources of the FPGA are occupied by inputs and outputs of multiple modules, which resulting in consuming of LUT resources of the FPGA, therefore, many modules with the same or similar input format and output format may be merged to reduce a waste of resources caused by the inputs and the outputs. For example, the addition, subtraction, multiplication, division and the like in the mathematical library of the CAFFE model which have some differences in arithmetic with each other and have similar interfaces, not only the arithmetic unit integration but also the module framework integration can be implemented after the modules are merged. An integrating method are described as follows. 1. Modules having the same or similar (that is, difference lies in a parameter) input and output interfaces are found from the computation module. For example, the same input and output interfaces indicate that the outputs are 32-bit integers, or 64-bit integers, that is, inputs and outputs are the same, the similar input and output interfaces indicate that a 64-bit interface is compatible for a 32-bit interface, and belong to similar modules. 2. Module functions are merged into a large module, and the identical computation resources are integrated (that is, to achieve the arithmetic unit integration), for example, in FIG. 3, the two input interfaces are merged into an input interface, the two output interfaces are merged into an output interface. 3. It is determined whether to skip or perform a part of the similar modules with different parameters based on a conditional judgment. For example, an input of the function A is 1, 2, an input of the function B is 1, 2, 3, an input of the merged AB is 1, 2, 3. The function A is implemented only when the input 3 is invalid. A condition judgment is required to judge the scope of 3, and the function A is different from the function B, it is skipped between the function modules based on whether the 3 is invalid or valid.

Figure 4:
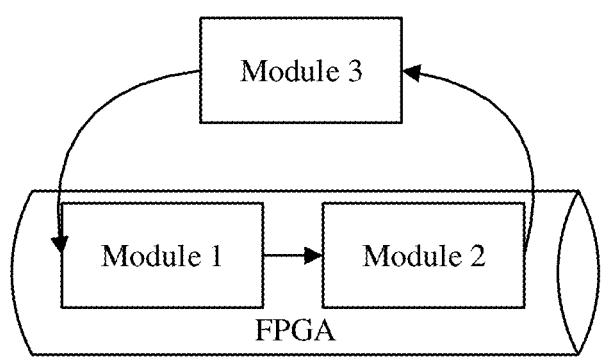
FIG. 4 is a schematic diagram showing module switching according to an embodiment of the present disclosure.

Next, the module switching is illustrated. The CNN includes multiple modules, in the iterative process, not all modules are in a computation state, and there is an order of executing the modules. For example, in a Mnist model, cyclic iterative computation is performed between the convolution layer, the pool layer, the complete connection layer and the like. FPGA resources are limited, and can not deploy all the modules of the whole CNN model in general. Delay of computation between modules may be used, a module completing computation may be switched to a module to be computed during an operation of a module, to implement the switch continuously, thereby achieving deployment and computation of all the modules in the CNN. As shown in FIG. 4, which is a schematic diagram showing module switching according to an embodiment of the present disclosure. The module switching method and the effect evaluation include the following step 1 to step 4.

In step 1, the CNN model is illustrated to include three modules (which are a module 1, a module 2 and a module 3). The module 1 and the module 2 are employed on the FPGA first, and computation is began, operating time of the two modules are t1 and t2 respectively.

In step 2, an operation state of the modules on the FPGA is monitored. The module 2 is operated after the module 1 completes operation. In this case, the module 1 is unloaded, and the module 3 is loaded, operating time of the module 3 is t3, and loading time of each of the module 1, the module 2 and the module 3 is T.

In step 3, the above process is repeated, switch and operating are performed among the multiple modules on the FPGA.

In step 4, if the loading time T is less than t1, t2, t3, there is no delay for each switch.

It should be noted that, for the above-described various embodiments of the method, for the sake of simplicity, the method is described as a combination of a series of actions, those skilled in the art should recognize that the present disclosure is not limited by the sequence of actions described above, this is because certain steps may be carried out in other order or at the same time according to the present disclosure. In addition, it is to be understood by those skilled in the art that the embodiments described in the specification are preferred embodiments and involved actions and modules are not necessary for the present disclosure.

A related device for carrying out the above-described solutions is provided in order to better implement the above-described solutions of the present disclosure.

As shown in FIG. 5-*a*, a CNN processing device 500 is provided according to an embodiment of the present disclosure, which may include a type acquiring unit 501, a deploying unit 502, a merging unit 503 and a module operating unit 504.

The type acquiring unit 501 is configured to acquire an intensity type of a first module in a CNN model.

The deploying unit 502 is configured to deploy the first module with an application specific integrated circuit ASIC and acquire multiple arithmetic unit resources of the ASIC which are occupied by the first module, in a case that the intensity type of the first module is a computation-intensity type.

The merging unit 503 is configured to obtain a first resource merging module by merging identical arithmetic unit resources among the multiple arithmetic unit resources of the ASIC which are occupied by the first module.

The module operating unit 504 is configured to operate the first resource merging module by the ASIC to recognize an image.

In some embodiments of the present disclosure, the type acquiring unit 501 is further configured to acquire an intensity type of a second module in the CNN model.

The deploying unit 502 is further configured to deploy the second module with the ASIC and acquire multiple arithmetic unit resources of the ASIC which are occupied by the second module, in a case that the intensity type of the second module is the computation-intensity type.

The merging unit 503 is further configured to merge the first module and the second module to obtain a third module, in a case that the arithmetic unit resources occupied by the first module are identical or partially identical to the arithmetic unit resources occupied by the second module, where a function of the third module includes a function of the first module and a function of the second module.

The module operating unit 504 is further configured to operate the third module by the ASIC.

In some embodiments of the present disclosure, the merging unit 503 is further configured to merge identical arithmetic unit resources of the ASIC which are occupied by the first module and the second module, and merge an input interface of the first module and an input interface of the second module, and merge an output interface of the first module and an output interface of the second module.

In some embodiments of the present disclosure, the module operating unit 504 is configured to set a come into effect condition for the function of the third module based on the function of the first module and the function of the second module, and determine whether to implement the function of the first module or the function of the second module by the ASIC based on the come into effect condition.

In some embodiments of the present disclosure, the merging unit 503 is further configured to obtain a second resource merging module by merging identical arithmetic unit resources among the multiple arithmetic unit resources of the ASIC which are occupied by the second module.

The module operating unit 504 is further configured to operate the second resource merging module by the ASIC.

In some embodiments of the present disclosure, as shown in FIG. 5-b, the CNN processing device 500 further includes a module switching unit 505 configured to: monitor an operation state of the first resource merging module on the ASIC during operating the first resource merging module by the ASIC; unload the first resource merging module from the ASIC after the first resource merging module completes operation on the ASIC; and load a fourth module in the CNN model to the ASIC.

In some embodiments of the present disclosure, the deploying unit 502 is further configured to deploy a mathematical library of the CNN model on the ASIC, where the mathematical library includes the first module.

In some embodiments of the present disclosure, the ASIC is a field programmable gate array FPGA.

It can be known based on the above description of the embodiment of the present disclosure that, an intensity type of a first module in a CNN model is acquired firstly, the first module is deployed with an ASIC and multiple arithmetic unit resources of the ASIC which are occupied by the first module are acquired in a case that the intensity type of the first module is a computation-intensity type, identical arithmetic unit resources among the multiple arithmetic unit resources of the ASIC which are occupied by the first module are merged to obtain the first module deployed with the ASIC in which arithmetic unit resources are merged, and the first module deployed with the ASIC in which arithmetic unit resources are merged is operated. In an embodiment of the present disclosure, the first module of the computation-intensity type may be migrated to the ASIC, so that module arithmetic in the CNN model is implemented by the ASIC without using the GPU, while both a deployment cost and an operation cost of the ASIC are much less than that of the GPU. In the embodiments of the present disclosure, the identical arithmetic unit resources in the first module of the computation-intensity type are merged, so that the arithmetic unit resources are utilized with a highest use efficiency, and thus, the computation performance of the CNN can be ensured.

Figure 6:
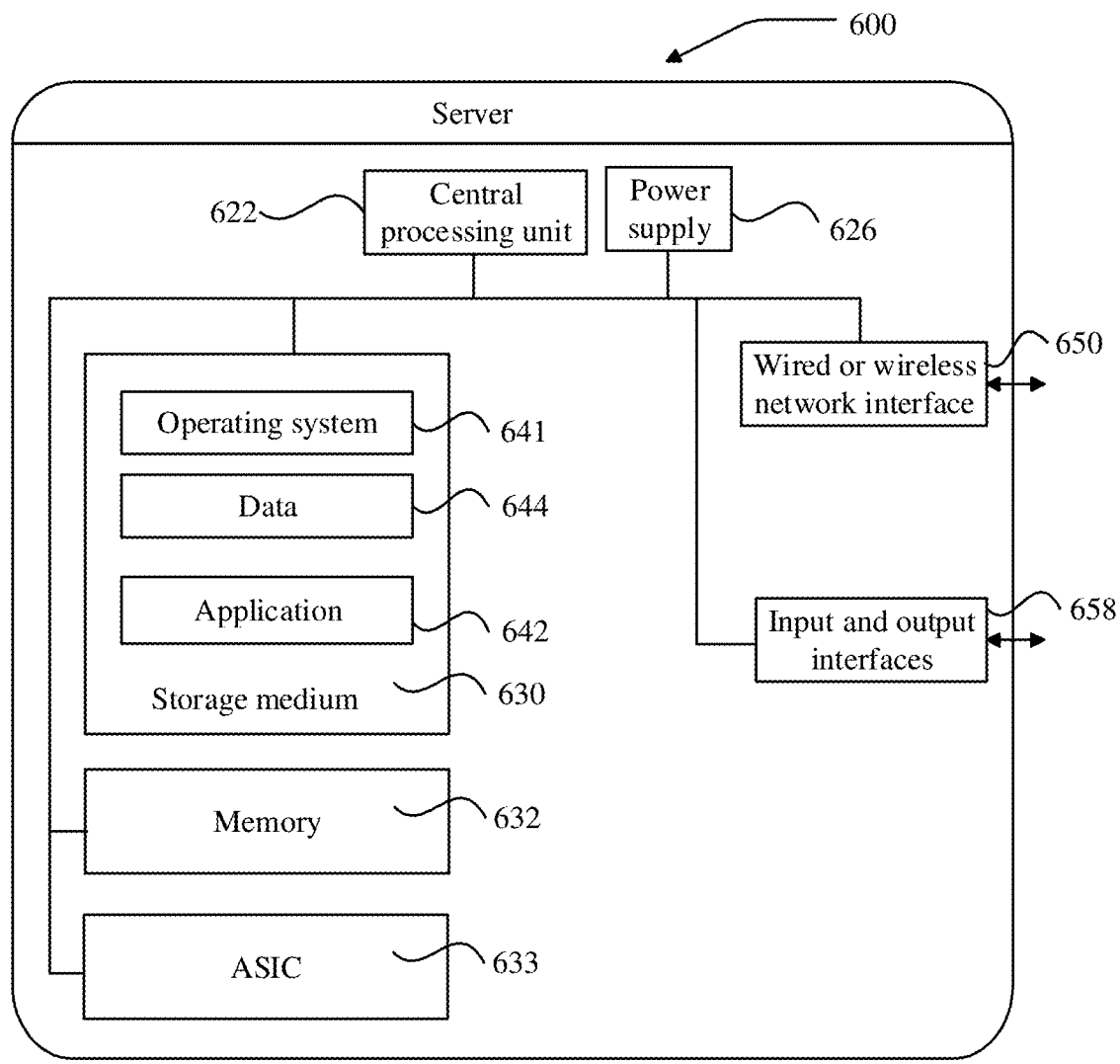
FIG. 6 is a schematic diagram showing a composition structure of a server to which a CNN processing method is applied according to an embodiment of the present disclosure.

FIG. 6 is a schematic diagram showing a structure of a server according to an embodiment of the present disclosure. The server 600 may vary considerably depending on a configuration or a performance and may include one or more central processing units (CPU) 622 (e.g., one or more processors), a memory 632, one or more storage medium 630 (e.g., one or more mass storage devices) that store an application 642 or data 644, and ASIC 633. The memory 632 and the storage medium 630 may be temporary storages or persistent storages. Programs stored in the storage medium 630 may include one or more modules (not shown in the drawing), each of the modules may include a series of instruction operations on the server. Furthermore, the central processing unit 622 may be configured to communicate with the storage medium 630 to perform the series of instruction operations in the storage medium 630 on the server 600, the ASIC 633 may be an FPGA, or a CPLD.

The server 600 may further include one or more power supplies 626, one or more wired or wireless network interfaces 650, one or more input and output interfaces 658, and/or one or more operating systems 641, such as Windows Server™, Mac OS X™, Unix™, Linux™, and FreeBSD™.

The steps performed by the server in the above-described embodiment may be based on the structure of the server shown in FIG. 6, which may perform the above-described CNN processing method, as described in the description of the above-described embodiments.

It is to be noted that the embodiment of the device described above is merely illustrative, and a unit described as a separating means may be or may not be physically separated, and a component shown as a unit may be or may not be a physical unit, that is, may be located in one place, or may be distributed to multiple network units. A part of or all the modules may be selected according to actual needs to achieve the purpose of the present embodiment. In addition, in the drawings of the embodiments of the device provided in the present disclosure, the connection relation between the modules indicates that there is a communication connection between the modules, and may be embodied as one or more communication buses or signal lines. Those skilled in the art can understand and practice the present disclosure without paying any creative work.

With the description of the above embodiments, it will be apparent to those skilled in the art that the present disclosure can be implemented by software and necessary general-purpose hardware, and may also be implemented by dedicated hardware including an application specific integrated circuit, a dedicated CPU, a dedicated memory, a dedicated component. In general, functions implemented by a computer program can be easily implemented by the appropriate hardware, and a specific hardware structure used to implement the same function can be varied, such as an analog circuit, a digital circuit, or a dedicated circuit. However, in more cases, an implementation by a software program is a better embodiment for the present disclosure. Based on this understanding, the technical solution of the present disclosure or a part of the technical solution making a contribution to the prior art may be embodied in the form of a software product stored in a readable storage medium, such as a floppy disk of a computer, a USB disk, a mobile hard disk, a read-only memory (ROM), a random access memory (RAM), a magnetic disk, or an optical disk, and the software product includes several instructions for causing a computer device (which may be a personal computer, a server, a network device, or the like) to perform method described in the various embodiments of the present disclosure.

For the above, the above-described embodiments are merely illustrative of the technical solution of the disclosure and are not intended to be limiting thereof. Although the disclosure is described in detail with reference to the above-described embodiments, it should be understood by those skilled in the art that the technical solution described in the above-described embodiments can be modified or some of the technical features of the technical solution can be equivalently replaced, and these modifications or substitutions do not depart from the spirit and scope of the technical solution of the various embodiments of the present disclosure.

The invention claimed is:

1. A convolutional neural network (CNN) processing method, comprising:
    acquiring an intensity type of a first module in a CNN model;
    in response of determining that the intensity type of the first module is a computation-intensity type, deploying the first module with an application specific integrated circuit (ASIC), wherein the first module occupies a plurality of arithmetic unit resources of the ASIC;
    acquiring the plurality of arithmetic unit resources of the ASIC which are occupied by the first module;
    obtaining a first resource merging module by merging identical arithmetic unit resources among the plurality of arithmetic unit resources of the ASIC which are occupied by the first module;
    operating the first resource merging module by the ASIC;
    acquiring an intensity type of a second module in the CNN model;
    in response of determining that the intensity type of the second module is the computation-intensity type, deploying the second module with the ASIC, and acquiring a plurality of arithmetic unit resources of the ASIC which are occupied by the second module;
    merging the first module and the second module to obtain a third module, in a case that the arithmetic unit resources occupied by the first module are identical or partially identical to the arithmetic unit resources occupied by the second module, wherein a function of the third module comprises a function of the first module and a function of the second module; and
    operating the third module by the ASIC,
    wherein the method is performed by a processor.

2. The method according to claim 1, wherein the merging the first module and the second module comprises:
    merging identical arithmetic unit resources of the ASIC which are occupied by the first module and the second module; and
    merging an input interface of the first module and an input interface of the second module, and merging an output interface of the first module and an output interface of the second module.

3. The method according to claim 1, wherein the operating the third module by the ASIC comprises:
    setting a come into effect condition for the function of the third module based on the function of the first module and the function of the second module; and
    determining whether to implement the function of the first module or the function of the second module by the ASIC based on the come into effect condition.

4. The method according to claim 1, wherein after deploying the second module with the ASIC and acquiring the plurality of arithmetic unit resources of the ASIC which are occupied by the second module, the method further comprises:
    obtaining a second resource merging module by merging identical arithmetic unit resources among the plurality of arithmetic unit resources of the ASIC which are occupied by the second module; and
    operating the second resource merging module by the ASIC.

5. The method according to claim 1, further comprising:
    monitoring an operation state of the first resource merging module on the ASIC during operating the first resource merging module by the ASIC;
    unloading the first resource merging module from the ASIC after the first resource merging module completes operation on the ASIC; and
    loading a fourth module in the CNN model to the ASIC.

6. The method according to claim 1, further comprising:
    deploying a mathematical library of the CNN model on the ASIC, wherein
    the mathematical library comprises the first module.

7. The method according to claim 1, wherein the ASIC is a field programmable gate array (FPGA).

8. A convolutional neural network (CNN) processing device, comprising a processor and a memory for storing program instructions, wherein the processor is configured to execute the program instructions to:
    acquire an intensity type of a first module in a CNN model;
    in response of determining that the intensity type of the first module is a computation-intensity type, deploy the first module with an application specific integrated circuit (ASIC), wherein the first module occupies a plurality of arithmetic unit resources of the ASIC;
    acquire the plurality of arithmetic unit resources of the ASIC which are occupied by the first module;
    obtain a first resource merging module by merging identical arithmetic unit resources among the plurality of arithmetic unit resources of the ASIC which are occupied by the first module;
    operate the first resource merging module by the ASIC;
    acquire an intensity type of a second module in the CNN model;
    in response of determining that the intensity type of the second module is the computation-intensity type, deploy the second module with the ASIC, and acquire a plurality of arithmetic unit resources of the ASIC which are occupied by the second module;
    merge the first module and the second module to obtain a third module, in a case that the arithmetic unit resources occupied by the first module are identical or partially identical to the arithmetic unit resources occupied by the second module, wherein a function of the third module comprises a function of the first module and a function of the second module; and operate the third module by the ASIC.

9. The device according to claim 8, wherein the processor is further configured to execute the program instructions to:

merge identical arithmetic unit resources of the ASIC which are occupied by the first module and the second module; and merge an input interface of the first module and an input interface of the second module, and merge an output interface of the first module and an output interface of the second module.

10. The device according to claim 8, wherein the processor is further configured to execute the program instructions to:

set a come into effect condition for the function of the third module based on the function of the first module and the function of the second module; and determine whether to implement the function of the first module or the function of the second module by the ASIC based on the come into effect condition.

11. The device according to claim 8, wherein the processor is further configured to execute the program instructions to:

obtain a second resource merging module by merging identical arithmetic unit resources among the plurality of arithmetic unit resources of the ASIC which are occupied by the second module; and operate the second resource merging module by the ASIC.

12. The device according to claim 8, wherein the processor is further configured to execute the program instructions to:

monitor an operation state of the first resource merging module on the ASIC during operating the first resource merging module by the ASIC;

unload the first resource merging module from the ASIC after the first resource merging module completes operation on the ASIC; and load a fourth module in the CNN model to the ASIC.

13. The device according to claim 8, wherein the processor is further configured to execute the program instructions to deploy a mathematical library of the CNN model on the ASIC, wherein the mathematical library comprises the first module.

14. The device according to claim 8, wherein the ASIC is a field programmable gate array (FPGA).

15. A nonvolatile storage medium for storing one or more computer programs, wherein the computer programs comprise instructions executable by a processor comprising one or more memories; and the processor executes the instructions to perform a convolutional neural network (CNN) processing method, wherein the CNN processing method comprises:

acquiring an intensity type of a first module in a CNN model;

in response of determining that the intensity type of the first module is a computation-intensity type, deploying the first module with an application specific integrated circuit (ASIC), wherein the first module occupies a plurality of arithmetic unit resources of the ASIC;

acquiring the plurality of arithmetic unit resources of the ASIC which are occupied by the first module;

obtaining a first resource merging module by merging identical arithmetic unit resources among the plurality of arithmetic unit resources of the ASIC which are occupied by the first module;

operating the first resource merging module by the ASIC;

acquiring an intensity type of a second module in the CNN model;

in response of determining that the intensity type of the second module is the computation-intensity type, deploying the second module with the ASIC, and acquiring a plurality of arithmetic unit resources of the ASIC which are occupied by the second module;

merging the first module and the second module to obtain a third module, in a case that the arithmetic unit resources occupied by the first module are identical or partially identical to the arithmetic unit resources occupied by the second module, wherein a function of the third module comprises a function of the first module and a function of the second module; and operating the third module by the ASIC.

16. The nonvolatile storage medium according to claim 15, wherein the merging the first module and the second module comprises:

merging identical arithmetic unit resources of the ASIC which are occupied by the first module and the second module; and merging an input interface of the first module and an input interface of the second module, and merging an output interface of the first module and an output interface of the second module.

17. The nonvolatile storage medium according to claim 15, wherein the operating the third module by the ASIC comprises:

setting a come into effect condition for the function of the third module based on the function of the first module and the function of the second module; and determining whether to implement the function of the first module or the function of the second module by the ASIC based on the come into effect condition.

18. The nonvolatile storage medium according to claim 15, wherein after deploying the second module with the ASIC and acquiring the plurality of arithmetic unit resources of the ASIC which are occupied by the second module, the method further comprises:

obtaining a second resource merging module by merging identical arithmetic unit resources among the plurality of arithmetic unit resources of the ASIC which are occupied by the second module; and operating the second resource merging module by the ASIC.

19. The nonvolatile storage medium according to claim 15, the method further comprises:

monitoring an operation state of the first resource merging module on the ASIC during operating the first resource merging module by the ASIC;

unloading the first resource merging module from the ASIC after the first resource merging module completes operation on the ASIC; and loading a fourth module in the CNN model to the ASIC.

20. The nonvolatile storage medium according to claim 15, the method further comprises:

deploying a mathematical library of the CNN model on the ASIC, wherein the mathematical library comprises the first module.

* * * * *